United States Patent [19]
Wang

[11] Patent Number: 5,996,189
[45] Date of Patent: Dec. 7, 1999

[54] WOVEN FASTENER PRODUCT

[75] Inventor: Der-Shi Wang, Bedford, Mass.

[73] Assignee: Velcro Industries B.V., Curacao, Netherlands

[21] Appl. No.: 09/050,501

[22] Filed: Mar. 30, 1998

[51] Int. Cl.⁶ .......................... A44B 13/00; A44B 18/00; B32B 7/00
[52] U.S. Cl. ............................... 24/451; 24/442; 24/445; 24/446; 24/452
[58] Field of Search ............................. 24/442, 451, 452, 24/445, 446, 447, 448

[56] References Cited

U.S. PATENT DOCUMENTS

| | | |
|---|---|---|
| 2,717,437 | 9/1955 | De Mestral . |
| 3,261,069 | 7/1966 | Marhison ................................... 24/452 |
| 3,319,307 | 5/1967 | Marforio ................................... 24/445 |
| 3,387,345 | 6/1968 | Savoir . |
| 3,469,289 | 9/1969 | Whitacre ................................... 24/442 |
| 3,555,630 | 1/1971 | Wylde . |
| 4,646,397 | 3/1987 | Yoshida . |
| 4,818,580 | 4/1989 | Böttger et al. . |
| 5,169,709 | 12/1992 | Fleischer . |
| 5,399,418 | 3/1995 | Hartmanns et al. . |
| 5,436,051 | 7/1995 | Donaruma et al. . |
| 5,457,855 | 10/1995 | Kenney et al. . |
| 5,659,930 | 8/1997 | Okawa . |
| 5,686,163 | 11/1997 | Tsubata et al. ........................... 24/446 |

FOREIGN PATENT DOCUMENTS 0977532  11/1975  Canada .................................... 24/451

OTHER PUBLICATIONS

Awareness of inventor, prior to invention, of plain webbings, or strapping, in industrial and automotive applications, of products having tubular structures extending along the sides of the product to provide soft edges, No date is given.

*Primary Examiner*—Victor N. Sakran
*Attorney, Agent, or Firm*—Fish & Richardson P.C.

[57] ABSTRACT

A woven hook-and-loop fastener product includes a base fabric and at least one edge extending in the warp direction that serves as a load-dissipating structure. The edge is a resilient tube structure or a fabric woven to be thicker than the base fabric.

20 Claims, 5 Drawing Sheets

WOVEN FASTENER PRODUCT

BACKGROUND OF THE INVENTION

This invention relates to woven touch fastener products for hook-and-loop fastening. These products provide arrays of small hook and loop elements that releasably engage to form closures.

Hook and loop fasteners are often used on straps and webbing engaged with sensitive objects. For example, the fasteners are used on garments, shoes, luggage, back packs and other items that are in contact with or bear upon the flesh of a user to transmit significant loads.

SUMMARY

A fastener product is provided that includes a main body fabric having a woven base, from which a field of integrally formed fastener elements project, and enlarged edges constructed to serve as load-dissipating structures, for distributing edge forces over a relatively large area. Resilient edge-forming tubes and edge portions woven to be thicker than the woven base function to be comfortable to a user or to protect a sensitive object, while providing releasable closure load bearing straps or other devices.

In a general aspect, a woven fastener product is featured having a main fabric body including a woven base and an array of fibrous fastener elements anchored to and projecting from the woven base for engaging cooperating fastener elements of an overlying layer. The woven base has warp and filling yarns extending in warp and filling directions. The fastener product has at least one integral edge portion, extending in the warp direction, that, in cross-section, is enlarged relative to the woven base, capable of serving as a load-dissipating structure.

Embodiments of this principle may include one or more of the following features.

The edge portion is a resilient, woven tube structure. The woven base is a single layer and the tube structure is formed by an edge loop of the layer. The woven base includes a first layer and a second layer and the tube structure is formed by a margin portion that joins the first layer and the second layer. Multiple binding yarns are interwoven between the first layer and the second layer to integrally attach the first layer to the second layer, and the binding yarns being excluded from the margin portion. A stuffer yarn extends through the woven tube structure.

The edge portion has a thickness greater than the thickness of the woven base. The edge portion includes warp and filling yarns, the warp yarns having a thickness greater than the thickness of the warp yarns of the main body.

The woven base is formed in part by multiple activated adhesive yarns that anchor the fastener elements to the woven base. The activated adhesive yarns are of a heat-activatable substance. The activated adhesive yarns are of a solvent-activatable substance.

The woven base is a tight weave that anchors the fastener elements to the base. The fastener elements are comprised of fastener element yarns interlaced with warp yarns of the woven base for anchoring the fastener elements to the woven base.

The woven base is a webbing having a thickness of at least 0.03 inches and a tensile strength in the warp direction of the webbing of at least 300 pounds per lineal inch of width of the webbing.

The woven base has a second edge portion, extending in the warp direction, that, in cross-section, is enlarged relative to the woven base, to serve as a load-dissipating structure.

The fastener elements are hook elements. The fastener elements are loop elements.

In another general aspect, the invention features a method for weaving a woven fastener product having a main fabric body including a woven base having warp and filling yarns extending respectively in warp and filling directions, and an array of fastener elements that project from and are anchored to the woven base. The method including forming an enlarged edge portion, in cross-section, of the fastener product relative to the woven base capable of serving as a load-dissipating structure.

Embodiments of this principle may include one or more of the following steps. Forming an enlarged edge portion includes forming a resilient tube structure. Forming an enlarged edge portion includes increasing the thickness of the edge portion relative to the thickness of the woven base.

Edges of the woven fastener product produced according to the described technique can be relatively soft to the touch, thus making the product desirable for applications involving frequent handling or direct contact with flesh. Furthermore, the back surface of the fastener product may have a flexible or soft texture because a coating of binder material applied to the backside is not required to anchor the fastener elements. The back surface can be grasped comfortably or placed against skin.

The fastener products, in the form of load-bearing webbings are useful in clothing, luggage, backpacks, shoes, etc. By manufacturing a comfortable webbing having integral fastener elements, it is not necessary to attach a non-load bearing fastener tape product to a webbing in a separate process to achieve load-bearing capability. This eliminates an expensive and difficult operation (e.g. sewing) and can improve the appearance and performance of the final product. For example, puckering is avoided, that can often occur in the sewing process, due to differential shrinkage of webbings and fastener products. Puckering can mar the appearance and sometimes compromises the function of the final product. Additionally, the integral fastener webbing assures uniform color shades and avoids any misalignment of edges of fastener tapes and webbings when they are formed separately.

Other features and advantages will be apparent from the following description and claims.

DESCRIPTION OF THE PREFERRED EMBODIMENTS

Figure 1:
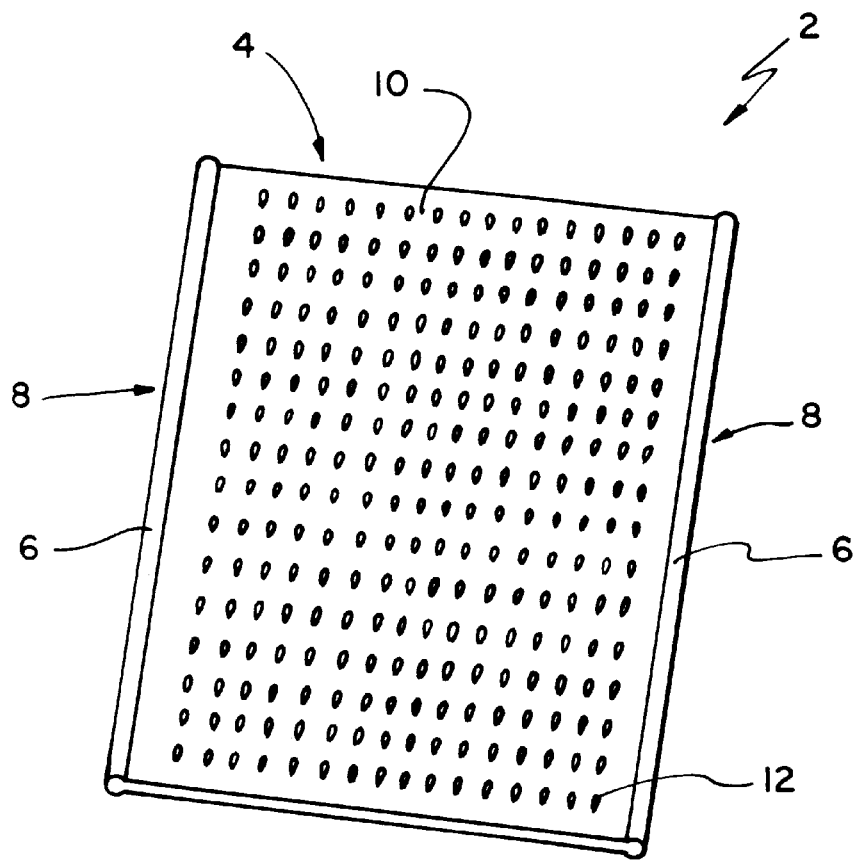
FIG. 1 is a diagrammatic view of a woven fastener product having soft edges.

Referring to the diagrammatic view of FIG. 1, a woven fastener product 2 has a main fabric body 4 and soft edges 6 that extend along warp direction sides 8 of the fastener product. As will be described in greater detail below, soft edges 6 dissipate applied forces allowing a user to comfortably touch the edges of woven fastener product 2. Main fabric body 4 includes a woven base 10 from which a dense array of fastener elements 12 projects for the purpose of engaging cooperating fastener elements on an overlying layer (not shown) to form a closure. For instance, the density of fastener hook elements is typically in excess of 200 hook elements per square inch preferably, in many instances, 500 or more hook elements per square inch.

Figure 2:
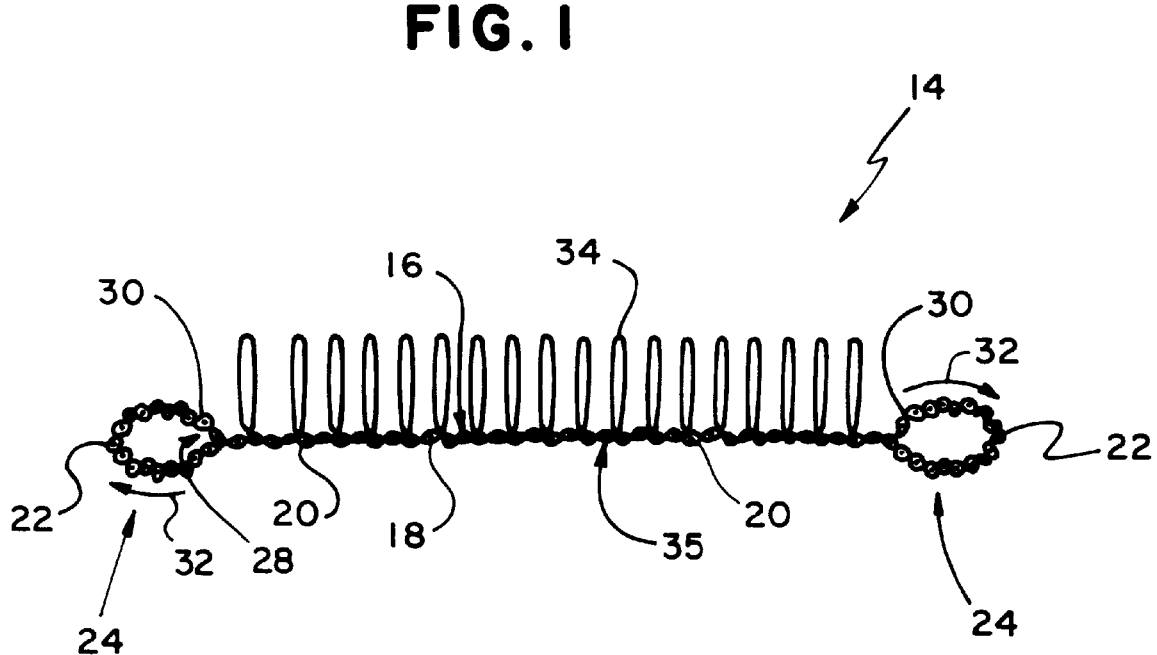
FIG. 2 is a cross-section of fastener tape having a base with a single layer and tube structures at the edges.

Referring to FIG. 2, a woven fastener tape 14 has a base 16 made of warp yarns 18 and filling yarns 20 and includes a woven tube structure 22 that extends in the warp direction at edges 24. Woven fastener tape 14, typically, has a thickness in the range of 0.012 inches to 0.015 inches and is suitable for use under relatively light loading.

Tube structure 22 is a tubular weave formed at edges 24 by well-known weaving techniques. During the weaving process, filling yarns 20 run in a cross-machine direction and are interlaced between warp yarns 18, which run in a machine direction. Base 16 includes a single layer 28 of warp yarns 18. Filling yarns 20 pass above and below respective adjacent warp yarns 18 in single layer 28 to produce a single layer of fabric. At edges 24, warp yarns 18 are arranged in a loop 30. Filling yarns 20 run clockwise around loop 30, as shown by arrows 32, passing above and below respective adjacent warp yarns 18 in the loop. At the end of loop 30, filling yarns 20 are interwoven with single layer 28 once again. The process produces tube structure 22 joined integrally to base 16 at edges 24.

An array of fastener elements 34, in the case of FIG. 2, loop elements, extend from base 16. Fastener elements 34 are formed by well-known processes. For instance, to form loop elements, multi-filament yarns which are interlaced with filling yarns 20 and pass over a lancette, that is, a wire extending in the warp direction above base 16. The lancette is subsequently withdrawn leaving multi-filament yarns in the shape of loops. Hook-shape elements are interwoven with base 16 in a similar manner, employing mono-filament yarns that are passed over lancettes during the weaving process. After the weaving process, the mono-filaments are heat-set and cut to form fastener hook-shape elements. The fastener elements may also have other shapes, such as mushroom-shapes, that are formed during weaving or in a post-processing step, for example by melting with a hot wire to form heads.

Fastener elements 34 can be secured to base 16 with a variety of techniques to prevent separation of the fastener elements from the base during use. In one case, solvent or water-based mixture of a binder material, for example polyurethane or acrylic latex, is applied to a back surface 35 of base 16 using a roller coater. The solution fully impregnates the fabric of base 16. A vaporization process, for example heating, evaporates the liquid component of the mixture and cures the binder material which anchors the bottom of fastener elements 34 to base 16.

In an implementation preferred in certain cases, the binder material is a component in adhesive yarns which are incorporated into the fabric of base 16. Adhesive yarns have a component that is activated to form a binding layer as by a heat treatment process or a solvent process. Heat-activated adhesive yarns include a low melting temperature component, for example, a polyurethane-based adhesive having a melting temperature between approximately 150° Celsius to 160° Celsius. In certain preferred cases the low melting temperature component may be a coating on a core material that has a higher melting temperature, for example nylon-6 having a melt temperature between approximately 230° Celsius to 235° Celsius. In other cases the adhesive yarn is made entirely of the low melting temperature constituent. In the heat treatment process, in either case, fastener tape 14 is heated to a temperature and for a time period that melts the low-melting temperature constituent but does not melt warp yarns 18, filling yarns 20 or the core material, if present. The melted constituent flows into intimate contact with the other yarns to form a matrix which anchors fastener elements 34 to base 16.

Solvent-activated adhesive yarns have a binding material constituent that is readily dissolvable in a solvent, for example, a polyurethane-based material which dissolves in toluene or methyl ethyl ketone (MEK). Base 16 is completely impregnated with the solvent to soften and cause the binding constituent to flow to again form a bonded matrix. The solvent is evaporated leaving the binding material in anchoring relationship with the bottom of fastener elements 34 to base 16.

Weaving techniques, themselves, may also be employed to secure fastener elements 34 to base 16. By using a tight weave for the fabric of base 16, fastener elements 34 are secured between adjacent warp yarns 18 which provide enough force to prevent separation of the fastener elements from base 16 during use. A tight weave is characterized by having a close fitting fabric construction which can be the result of several factors including employing a high density of warp 18 and filling yarns 20 per unit area of the base 16 and/or employing a large diameter of warp 18 and filling yarns 20.

Another weaving technique can be employed to secure the fastener hooks which involves securing fastener elements 34 to base 16 with the interlaces between fastener element yarn and warp yarns 18. The interlaces can act as anchoring points which prevent fastener elements 34 from being pulled away from base 16 during use. Typically, woven fastener products include one to four interlaces of fastener element yarn with warp yarns 18 between consecutive fastener elements 34, which generally does not provide sufficient anchoring force. By increasing the number of interlaces between consecutive fastener elements to ten, for example, it is possible to adequately secure fastener elements 34 to base 16.

Weaving techniques for anchoring fastener elements 34 to base 6 may be used in combination with a binder material to reinforce the anchoring. In cases where fastener tape 14 is frequently handled it may be advantageous to avoid coating back surface 35 with a water or solvent-based binder material which, when cured, can give the tape a stiff or rough surface. Thus by using other methods, such as adhesive yarns or the above-described weaving techniques, it is possible to create a product with a "kind" back surface 35.

Figure 3A:
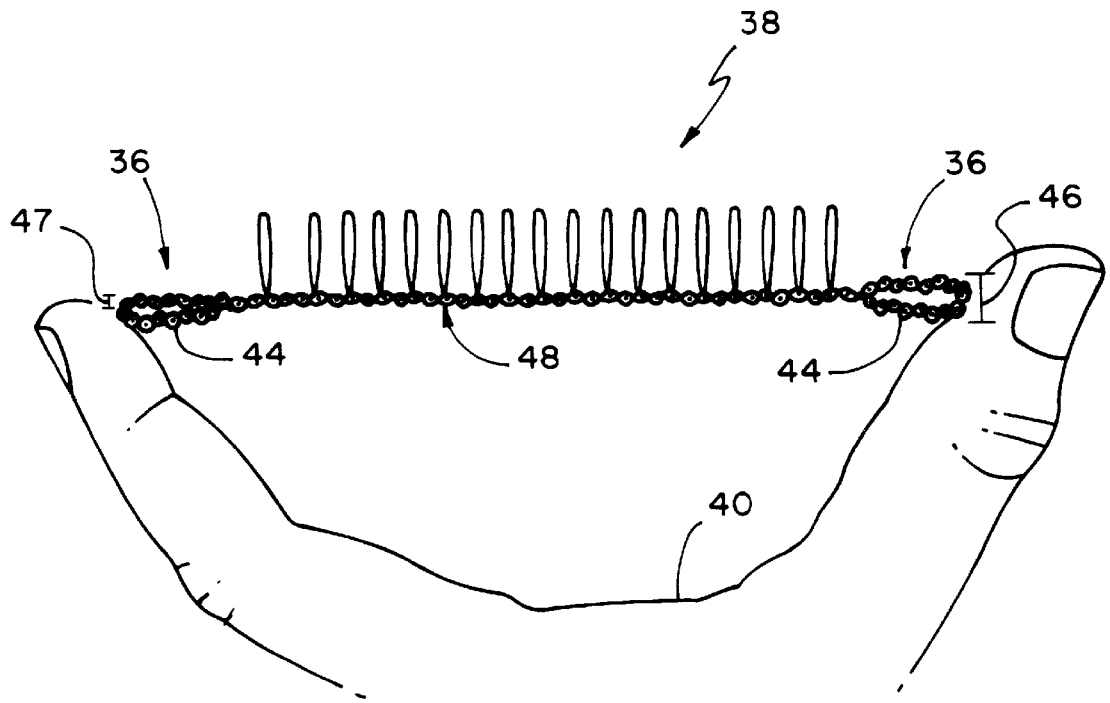
FIGS. 3A and 3B are schematic illustrations of a hand applying a force to the edges of the fastener tape of FIG. 2.
Figure 3B:
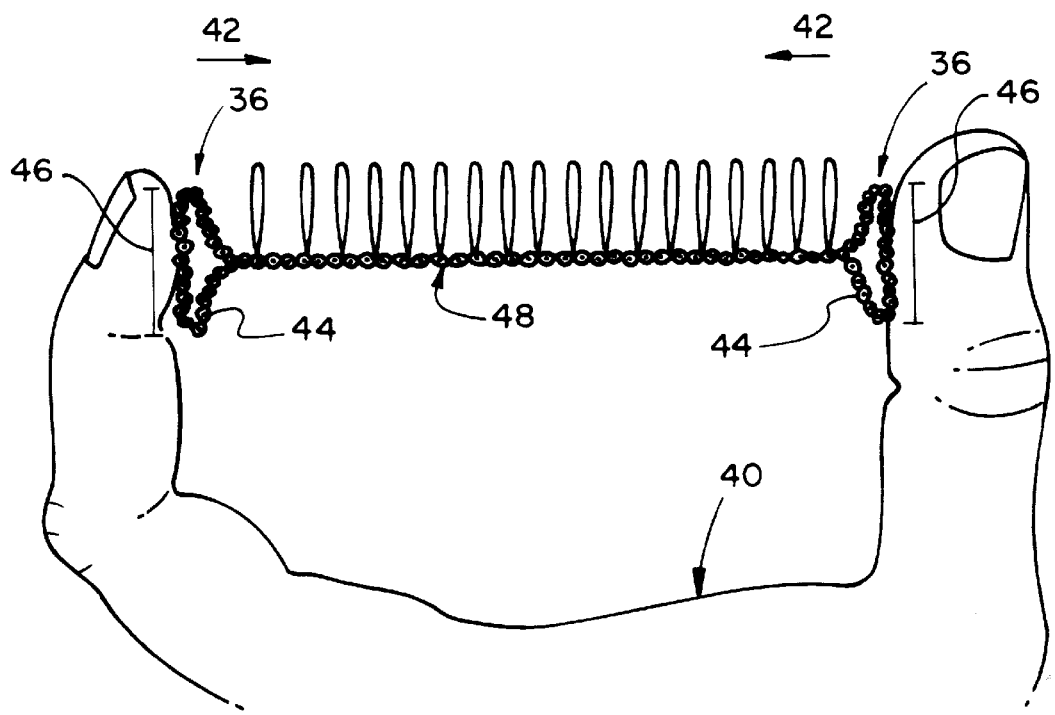

Referring to FIGS. 3A and 3B, a force is applied to each edge 36 of a fastener product 38 having a base 48 by a hand 40 in the direction indicated by arrows 42. Before the force is applied a tube structure 44 at each edge 36 is typically flat, having no internal member to define the tube shape. (FIG. 3A) Tube structure 44 has a thickness 46 greater than the thickness 47 of base 48. The applied force acts to compress tube structure 44 in the direction of arrows 42, thus increasing thickness 46 and the area of tube structure 44 in contact with hand 40. (FIG. 3B) Thickness 46 of the compressed tube structure 44 is significantly greater than thickness 47 of base 48.

The pressure felt by hand 40 as it applies the force to edge 36 is representative of the softness of the edge. (Pressure being equal to force divided by area.) The greater thickness over which force is applied, results in relatively low pressure and edge 36 having the tube structure 46 feels softer than would an edge having thickness 47 of base 48.

Figure 4:
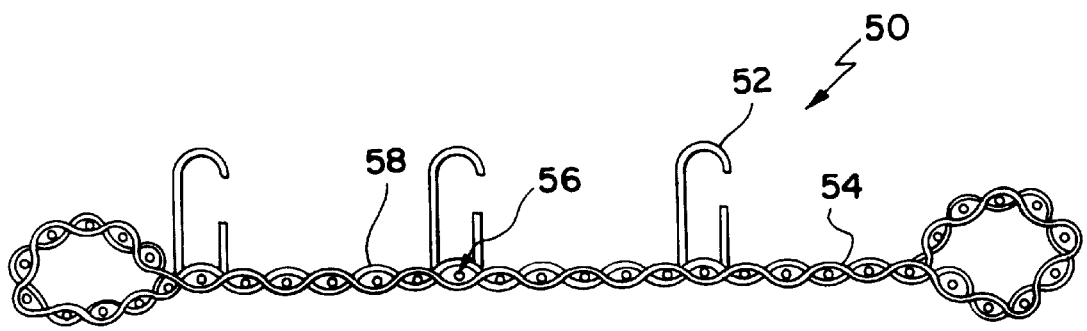
FIG. 4 is a cross-section of a fastener webbing having a base with a single layer and tube structures at the edges.

Referring to FIG. 4, a woven fastener webbing 50 includes fastener elements 52 that extend from a base 54. Base 54 has a thickness of greater than approximately 0.03 inches and has a tensile strength in the warp direction of at least 300 pounds per lineal inch of width of the webbing making it is suitable for use in load-bearing applications. Base 54 is a single layer of fabric in which warp yarns 56 and filling yarns 58 are thicker than respective warp yarns 18 and filling yarns 20 of woven fastener tape 14 in FIG. 2. For example, warp yarns 56 and filling yarns 58 of woven fastener webbing 50 are in the range of 1000 denier and warp yarns 18 and filling yarns 20 of woven fastener tape 14 are in the range of 100 denier. Alternatively, warp yarns 56 and filing yarns 58 can be bundles made of multiple yarns.

Figure 5:
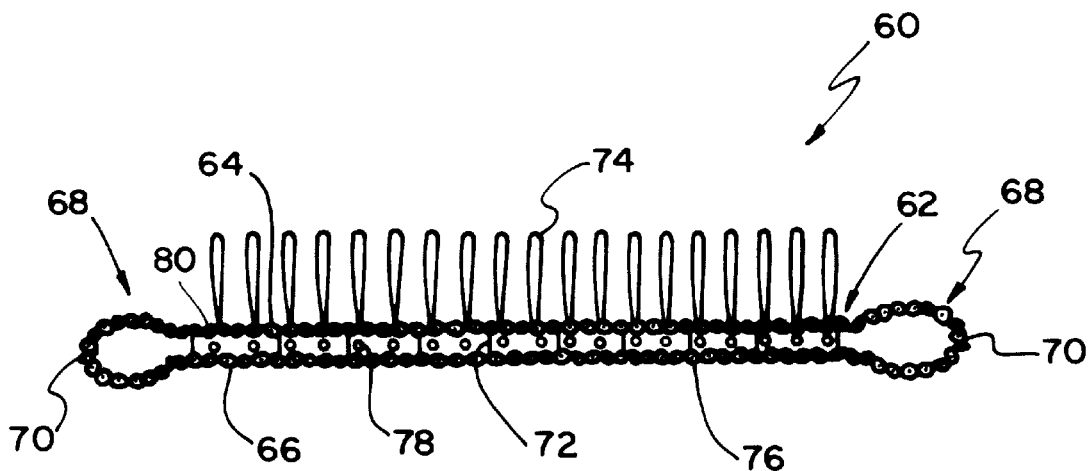
FIG. 5 is a cross-section of a fastener product having a base with two layers and fastener elements extending from the upper layer.
Figure 6:
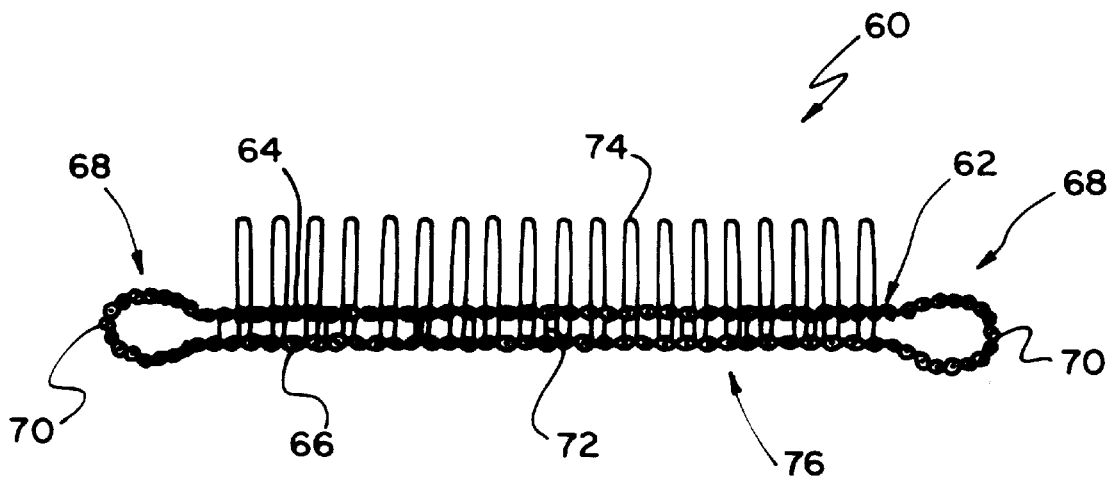
FIG. 6 is a cross-section of a fastener product having a base with two layers and fastener elements extending from the lower layer.

Referring to FIGS. 5 and 6, a woven fastener product 60 includes a base 62 having a first fabric layer 64 and a second fabric layer 66 continuously joined at edges 68 to define tube structures 70. Woven fastener product 60 can be either a fastener tape or a fastener webbing. Away from edges 68, binding yarns 72 are interwoven to attach first fabric layer 64 to second fabric layer 66 and form an integral base 62. Tube structures 70 are formed by excluding binding yarns 72 from regions around edges 68. The size of tube structures 70 is determined by the size of the regions around edges 68 which does not include binding yarns 72. By increasing the size of tube structures 70, it is possible to give a softer feel to edges 68.

Referring to FIG. 5, fastener elements 74 extend from first fabric layer 64. Adhesive yarns 78 are woven into base 62 to secure fastener elements 74 to the base, as described above. Because base 62 includes two foundation fabrics 64, 66, it may be difficult for a binder coating applied to a back surface 76 to fully impregnate the base and secure fastener elements to first foundation fabric 64.

Referring to FIG. 6, a second embodiment of woven fastener product 60 in which fastener elements 74 project from second layer 66. Fastener elements 74 pass between the fabric of first layer 64.

Figure 7:
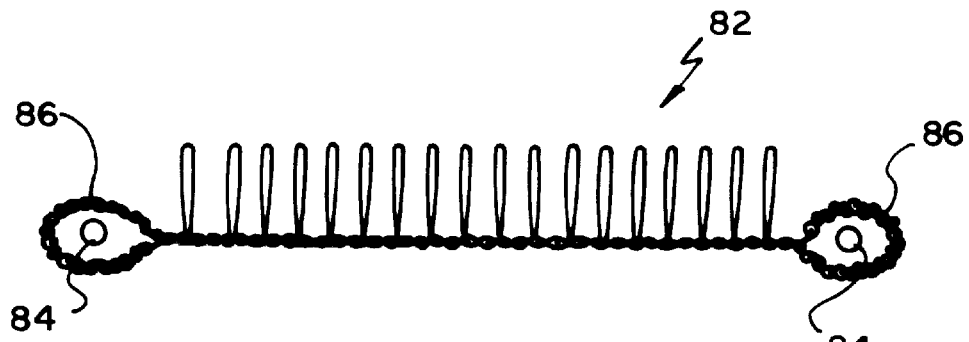
FIG. 7 is a cross-section of a woven fastener product with stuffer yarns extending through tube structures at the edges.

Referring to FIG. 7, a woven fastener product 82 includes stuffer yarns 84 that extend through tube structures 86. Stuffer yarns 84 act to define the shape of tube structures 86 by providing internal support. When a force is applied to compress tube structures 84, stuffer yarns act to increase the stiffness of the tube structures.

Figure 8:
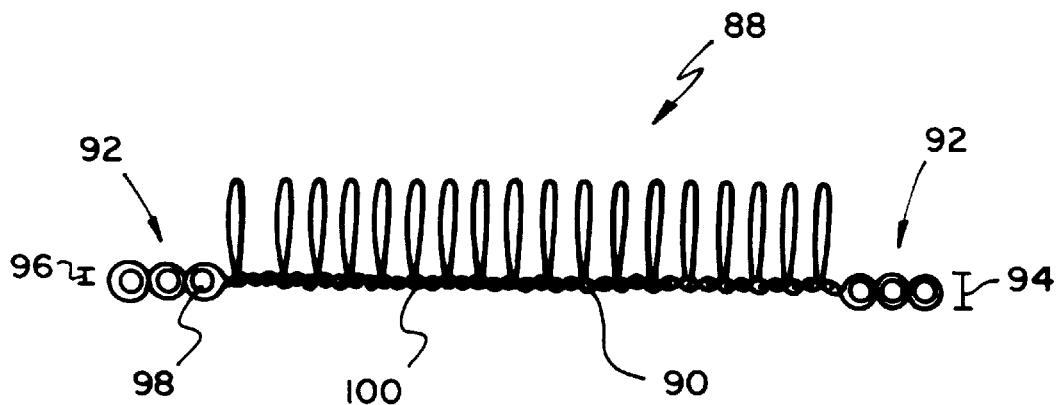
FIG. 8 is a cross-section of a woven fastener product having edges of a greater thickness than the base.

Referring to FIG. 8, a woven fastener product 88 includes a base 90 and edges 92. Edge thickness 94 is greater than base thickness 96. Edges 92 include warp yarns 98, or bundles of warp yarns, thicker than warp yarns 100 of base 90. Edges 92 dissipate forces over a relatively large area. As described above with reference to edges having a tube structure (FIGS. 3A and 3B), the increase in area over which edges 92 return a force gives the edge a softer feel than edges of base thickness 96.

Figure 9:
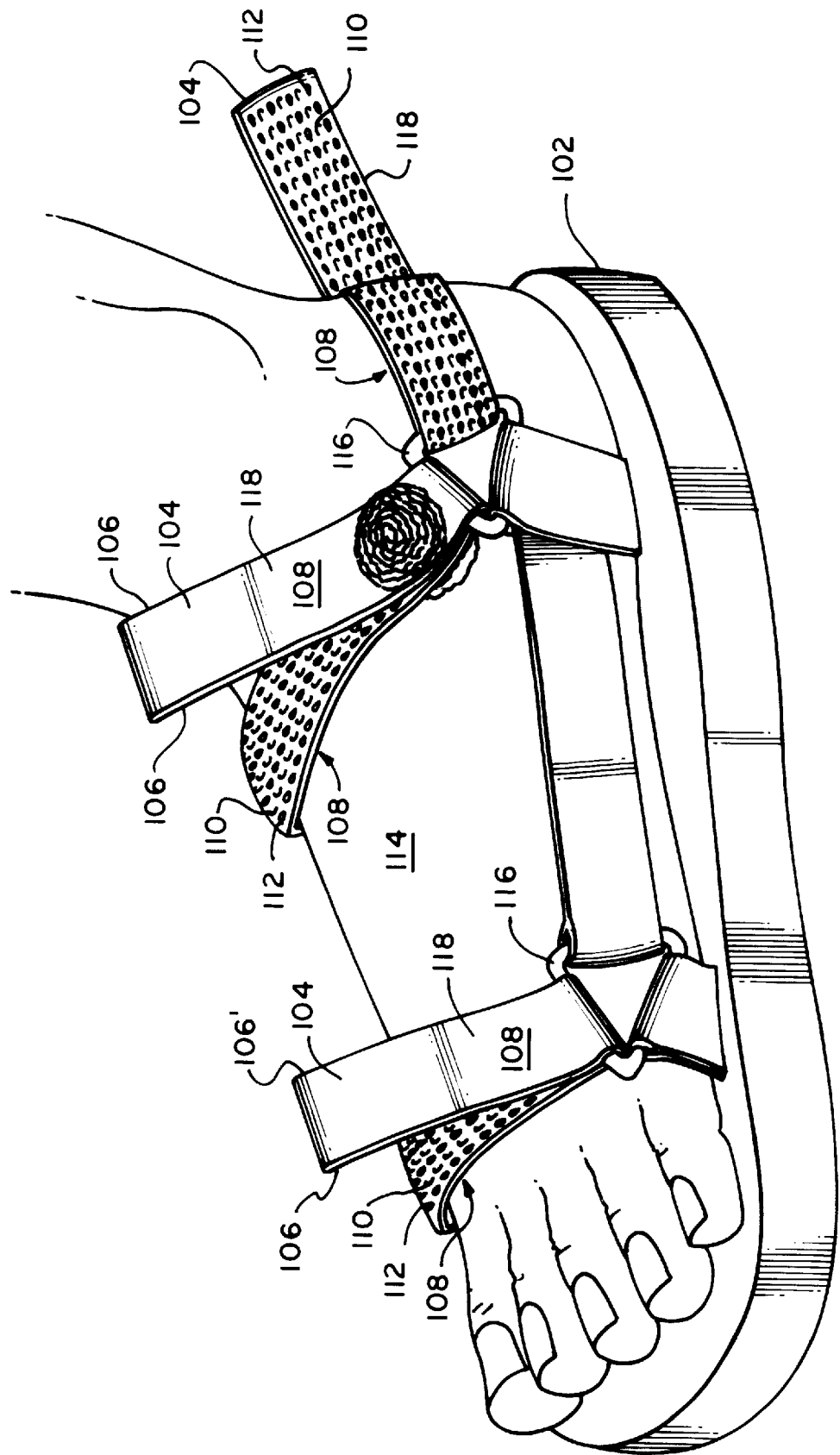
FIG. 9 shows the woven fastener product on a sandal.

To illustrate one of many possible examples of use, FIG. 9, shows a sandal 102 that includes several woven fastener webbings 104 having soft edges 106 and smooth back surfaces 108. Fastener webbings 104 include rows of both hook elements 110 and loop elements 112. To secure sandal 102 to foot 114, fastener webbings 104 pass through buckles 116 to create an overlying portion 118. Hook and loop elements 110, 112 of overlying portion 118 engage cooperating hook and loop elements 110, 112 on respective fastener webbings 104 to make a closure. Soft edges 106 and smooth back surfaces 108 allow a person to easily grasp fastener webbings 104 and adjust sandal 102 to make it comfortable to wear. Fastener webbings 104 have a strength great enough to withstand typical loads as foot 114 is flexed, for example when a person runs or jumps.

What is claimed is:

1. A woven fastener product having a main fabric body comprised of a woven base having warp and filling yarns extending respectively in warp and filling directions and an array of fibrous fastener elements anchored to and projecting from the woven base for engaging cooperating fastener elements of an overlying layer, the fastener product having at least one integral edge portion, extending in the warp direction, that, in cross-section, is enlarged relative to the woven base, to serve as a load-dissipating structure.

2. The woven fastener product of claim 1 wherein the edge portion comprises a resilient, woven tube structure.

3. The woven fastener product of claim 2 wherein the woven base comprises a single layer and the tube structure is formed by an edge loop of the layer.

4. The woven fastener product of claim 2 wherein the woven base comprises a first layer and a second layer, the tube structure formed by a margin portion that joins the first layer and the second layer.

5. The woven fastener product of claim 4 wherein multiple binding yarns are interwoven between the first layer and the second layer to integrally attach the first layer to the second layer, the binding yarns being excluded from the margin portion.

6. The woven fastener product of claim 2 wherein a stuffer yarn extends through the woven tube structure.

7. The woven fastener product of claim 1 wherein the edge portion has a thickness greater than the thickness of the woven base.

8. The woven fastener product of claim 7 wherein the edge portion comprises warp and filling yarns, the warp yarns having a thickness greater than the thickness of the warp yarns of the woven base.

9. The woven fastener product of claim 1 wherein the woven base is formed in part by multiple activated adhesive yarns that anchor the fastener elements to the woven base.

10. The woven fastener product of claim 9 wherein the activated adhesive yarns comprise a heat-activatable substance.

11. The woven fastener product of claim 10 wherein the activated adhesive yarns comprise a solvent-activatable substance.

12. The woven fastener product of claim 1 wherein the woven base comprises a tight weave that anchors the fastener elements to the woven base.

13. The woven fastener product of claim 1 wherein the fastener elements comprise fastener element yarns that are interlaced with warp yarns of the woven base for anchoring the fastener elements to the woven base.

14. The woven fastener product of claim 1 wherein the woven base is a webbing having a thickness of at least 0.03 inches and a tensile strength in the warp direction of the webbing of at least 300 pounds per lineal inch of width of the webbing.

15. The woven fastener product of claim 1 wherein the woven base has a second edge portion, extending in the warp direction, that, in cross-section, is enlarged relative to the woven base, to serve as a load-dissipating structure.

16. The woven fastener product of claim 1 wherein the fastener elements are hook elements.

17. The woven fastener product of claim 1 wherein the fastener elements are loop elements.

18. A method of weaving a woven fastener product having a main fabric body comprised of a woven base having warp and filling yarns extending respectively in warp and filling directions and an array of fastener elements that project from and are anchored to the woven base comprising:

forming an enlarged edge portion, in cross-section, of the fastener product relative to the woven base that is capable of serving as a load-dissipating structure.

19. The method of claim 18 wherein forming the enlarged edge portion comprises forming a resilient tube structure.

20. The method of claim 18 wherein forming the enlarged edge portion comprises increasing the thickness of the edge portion relative to the thickness of the woven base.

\* \* \* \* \*